US009453737B2

(12) United States Patent
Nickolaou et al.

(10) Patent No.: US 9,453,737 B2
(45) Date of Patent: Sep. 27, 2016

(54) VEHICLE LOCALIZATION

(75) Inventors: James N. Nickolaou, Clarkston, MI (US); Daniel Gandhi, Auburndale, MA (US); Dmitriy Feldman, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 606 days.

(21) Appl. No.: 13/284,500

(22) Filed: Oct. 28, 2011

(65) Prior Publication Data

US 2013/0107669 A1 May 2, 2013

(51) Int. Cl.
*G01S 3/80* (2006.01)
*G01C 21/30* (2006.01)
*G01S 19/48* (2010.01)
*G01S 5/02* (2010.01)

(52) U.S. Cl.
CPC ............. *G01C 21/30* (2013.01); *G01S 5/0252* (2013.01); *G01S 19/48* (2013.01)

(58) Field of Classification Search
USPC ....................................................... 367/125
See application file for complete search history.

(56) References Cited

U.S. PATENT DOCUMENTS

| 7,787,689 | B2 * | 8/2010 | Anai | G06T 7/0044 348/129 |
| 7,844,077 | B2 * | 11/2010 | Kochi | G06T 7/0044 382/103 |
| 2006/0015249 | A1 * | 1/2006 | Gieseke | 701/210 |
| 2006/0271282 | A1 * | 11/2006 | Kuroda et al. | 701/208 |
| 2007/0124060 | A1 * | 5/2007 | Shimizu et al. | 701/207 |
| 2009/0175497 | A1 * | 7/2009 | Anai | G06T 7/0044 382/103 |
| 2009/0175498 | A1 * | 7/2009 | Kochi | G06T 7/0044 382/103 |
| 2009/0284360 | A1 * | 11/2009 | Litkouhi | 340/439 |
| 2009/0315693 | A1 * | 12/2009 | Nugent | 340/435 |
| 2010/0040279 | A1 * | 2/2010 | Yoon | G05D 1/0251 382/153 |
| 2010/0049391 | A1 * | 2/2010 | Nakano | G05D 1/024 701/23 |
| 2010/0106356 | A1 * | 4/2010 | Trepagnier et al. | 701/25 |
| 2010/0114481 | A1 * | 5/2010 | Roesser | 701/208 |
| 2010/0141518 | A1 * | 6/2010 | Hersey | G01C 13/008 342/357.64 |
| 2010/0253542 | A1 * | 10/2010 | Seder et al. | 340/932.2 |
| 2010/0253602 | A1 * | 10/2010 | Szczerba et al. | 345/8 |
| 2011/0025851 | A1 * | 2/2011 | Rumble | G01J 5/02 348/148 |

FOREIGN PATENT DOCUMENTS

| CN | 101241188 A | 8/2008 |
| CN | 101876750 A | 11/2010 |
| DE | 4217555 A1 | 12/1993 |

OTHER PUBLICATIONS

English Machine Translation of DE 4217555 A1.*
State Intellectual Property Office of the Peoples' Republic of China, Office Action in Chinese Patent Application No. 201210416298.5, mailed Dec. 3, 2014.

* cited by examiner

*Primary Examiner* — James Hulka
(74) *Attorney, Agent, or Firm* — Lorenz & Kopf, LLP

(57) ABSTRACT

Methods, systems, and vehicles are provided for localizing a vehicle. A sensor is configured to detect an object disposed in a generally upward direction from the vehicle while the vehicle is travelling. A processor is coupled to the sensor. The processor is configured to correlate the object with information from a map database, thereby generating a correlation, and determine a geographic location of the vehicle based on the correlation.

17 Claims, 3 Drawing Sheets

VEHICLE LOCALIZATION

TECHNICAL FIELD

The present disclosure generally relates to the field of vehicles and, more specifically, to methods and systems for localizing with respect to a geographic location of the vehicle.

BACKGROUND

Certain vehicles today include systems that obtain information as to a geographic location of the vehicle. For example, many vehicles today include a global positioning system (GPS) and/or another type of system (such as a triangulation system) for obtaining information as to the geographic location of the vehicle. However, such systems generally have a margin of error due to system constraints. Such systems also may have reduced effectiveness at certain times, such as when a bridge, a tunnel, and/or another overhead object may temporarily block or inhibit communication of the system.

Accordingly, it is desirable to provide improved methods for localization of vehicles. It is also desirable to provide improved systems for localization of vehicles, and to provide improved vehicles that include such localization methods and systems. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for localizing a vehicle. The method includes the steps of detecting an object disposed in a generally upward direction from the vehicle while the vehicle is travelling, correlating the object with information from a map database, thereby generating a correlation, and determining a geographic location of the vehicle based on the correlation.

In accordance with another exemplary embodiment, a system is provided for localizing a vehicle. The system comprises a sensor and a processor. The sensor is configured to detect an object disposed in a generally upward direction from the vehicle while the vehicle is travelling. The processor is coupled to the sensor. The processor is configured to correlate the object with information from a map database, thereby generating a correlation, and determine a geographic location of the vehicle based on the correlation.

In accordance with a further exemplary embodiment, a vehicle is provided. The vehicle comprises a body, a drive system, and a localization system. The drive system is disposed within the body. The localization system is disposed within the body, and comprises a sensor and a processor. The sensor is configured to detect an object disposed in a generally upward direction from the vehicle while the vehicle is travelling. The processor is coupled to the sensor. The processor is configured to correlate the object with information from a map database, thereby generating a correlation, and determine a geographic location of the vehicle based on the correlation.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
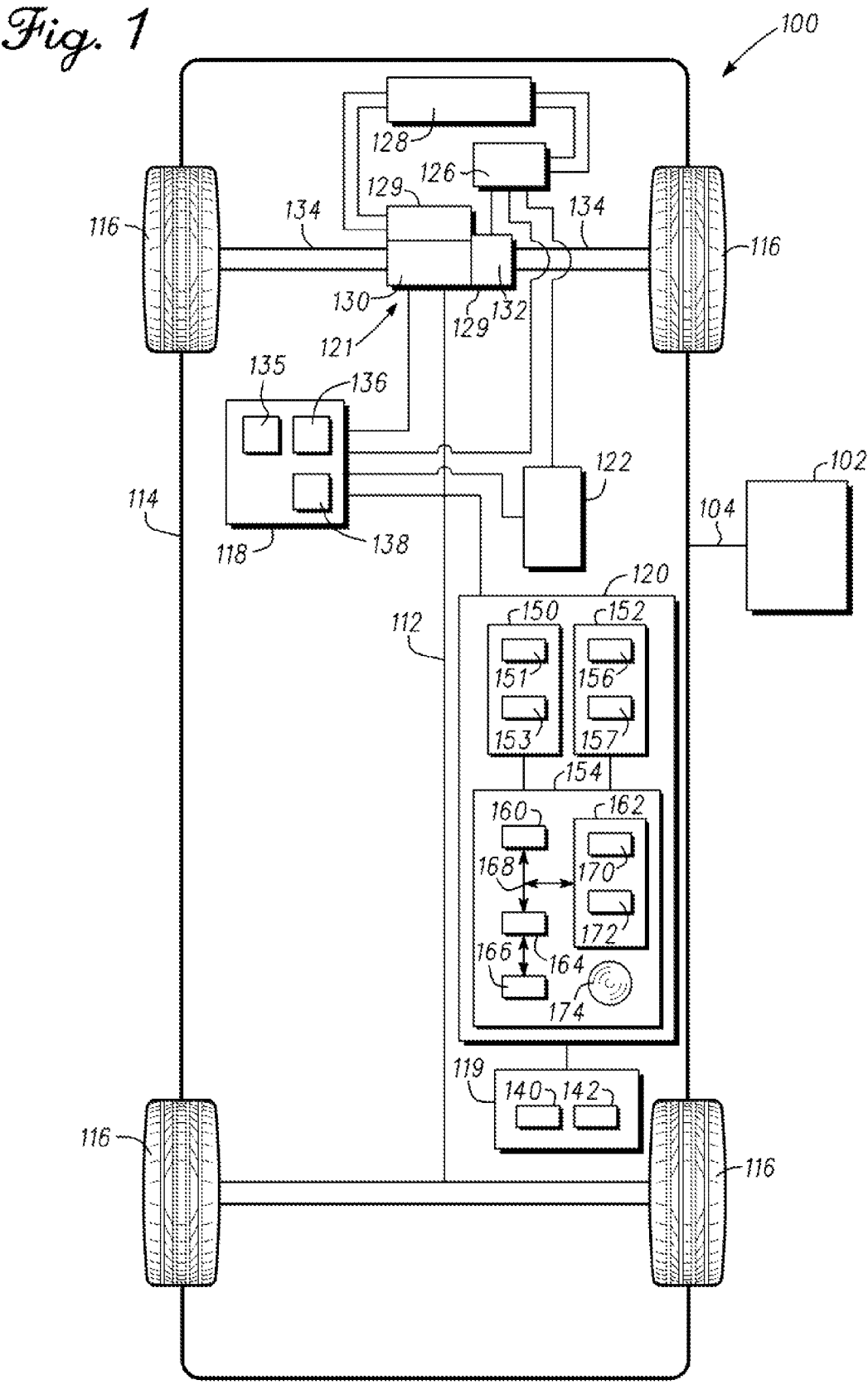
FIG. 1 is a functional block diagram of a vehicle that includes a vehicle localization system, in accordance with an exemplary embodiment.

FIG. 1 illustrates a vehicle 100, or automobile, according to an exemplary embodiment. The vehicle 100 is depicted alongside a remote server 102 through which the vehicle communicates via a wireless network 104. As described in greater detail further below, the vehicle 100 provides for improved localization of the vehicle's geographic position through the identification of objects located generally upward of the vehicle and correlating information pertaining to the identified objects with a map database of the geographic region in which the vehicle 100 is travelling.

The vehicle 100 includes a chassis 112, a body 114, four wheels 116, an electronic control system 118, a navigation system 119, and a localization system 120. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of electrical propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In the exemplary embodiment illustrated in FIG. 1, the vehicle 100 is a hybrid electric vehicle (HEV), and further includes an actuator assembly 121, a rechargeable energy storage system (RESS) 122, the above-referenced localization system 120, a power inverter assembly (or inverter) 126, and a radiator 128. The actuator assembly 121 includes at least one propulsion system 129 mounted on the chassis 112 that drives the wheels 116.

Specifically, as depicted in FIG. 1, the actuator assembly 121 includes a combustion engine 130 and an electric motor/generator (or motor) 132. As will be appreciated by one skilled in the art, the electric motor 132 includes a transmission therein, and, although not illustrated, also includes a stator assembly (including conductive coils), a rotor assembly (including a ferromagnetic core), and a cooling fluid or coolant. The stator assembly and/or the rotor assembly within the electric motor 132 may include multiple electromagnetic poles, as is commonly understood.

Still referring to FIG. 1, the combustion engine 130 and the electric motor 132 are integrated such that one or both are mechanically coupled to at least some of the wheels 116 through one or more drive shafts 134. In one embodiment, the vehicle 100 is a "series HEV," in which the combustion engine 130 is not directly coupled to the transmission, but coupled to a generator (not shown), which is used to power the electric motor 132. In another embodiment, the vehicle 100 is a "parallel HEV," in which the combustion engine 130 is directly coupled to the transmission by, for example, having the rotor of the electric motor 132 rotationally coupled to the drive shaft of the combustion engine 130.

The RESS 122 is electrically connected to the inverter 126. In one embodiment, the RESS 122 is mounted on the chassis 112. In one such embodiment, the RESS 122 is disposed within a cockpit of the vehicle. In another embodiment, the RESS 122 is disposed underneath a cockpit of the vehicle. The RESS 122 preferably comprises a rechargeable battery having a pack of battery cells. In one embodiment, the RESS 122 comprises a lithium iron phosphate battery, such as a nanophosphate lithium ion battery. Together the RESS 122 and the propulsion system 129 provide a drive system to propel the vehicle 100.

The radiator 128 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the combustion engine 130 and the inverter 126.

The control system 118 controls various functions pertaining to operation of the vehicle 100. In the depicted embodiment, the control system 118 includes an engine control unit 135 coupled to the engine 130 and configured to control the operation thereof. The control system 118 also includes an RESS control unit 136 coupled to the RESS 122 and configured to control the operation thereof. In addition, the control system 118 includes one or more active safety systems 138 configured to control aspects of vehicle operation to further improve safety (such as airbag systems, antilock brakes, traction control systems, electronic stability control, dynamic suspension control, and automatic braking, by way of example).

The navigation system 119 provides information to the driver and/or occupants of the vehicle 100 as to the geographic location of the vehicle. The navigation system 119 may similarly provide information as to a route travelled during a current ignition cycle of the vehicle, along with points of interest along or near the route. The navigation system 119 preferably includes an audio and/or visual display 140 for the driver with information pertaining to the geographic location and route travelled by the vehicle 100. In certain embodiments, the navigation system 119 also includes telecommunications equipment 142, such as one or antennas, transceivers, and/or other communications devices (such as for a global positioning system (GPS) and/or a cellular network system, by way of examples) for obtaining the geographic location and related information. In other embodiments, such communications devices may be part of one or more other vehicle units, such as the localization system 120, described directly below.

The localization system 120 is configured to localize the vehicle 100. The term localize (including localization and/or other variations thereof) includes the identification or determination of a geographic location or position of the vehicle 100. The localization system 120 includes a telecommunications system 150, a sensor array 152, and a computer system 154. In addition, although not illustrated as such, the localization system 120 (and/or one or more components thereof) may be part of the electronic control system 118, the navigation system 119, and/or one or more other vehicle systems.

The telecommunications system 150 facilitates communication between the vehicle 100 (specifically, the localization system 120 thereof) and the remote server 102 via the wireless network 104. In a preferred embodiment, the telecommunications system 150 receives data and information from the remote server 102 pertaining to a first, or initial, indication as to the geographic location of the vehicle 100. In addition, in certain embodiments, the telecommunications system 150 also receives a map database and/or information pertaining thereto from the remote server 102. The various types of data and information are provided to the computer system 154 for use in obtaining a more precise determination as to the geographic location of the vehicle, as described further below.

The telecommunications system 150 includes one or more transceivers 151 and antennas 153 for communication with the remote server 102. In certain embodiments, the transceivers 151 and/or antennas may be part of a separate system or device and coupled to the localization system 120. In one example, the telecommunications system 150 receives the data and information as part of a GPS network. In another example, the telecommunications system 150 receives the data and information as part of a cellular network and/or another type of radio frequency triangulation from a network.

The sensor array 152 includes one or more location sensors 156 and one or more other vehicle sensors 157. The one or more location sensors 156 detect objects that are generally above the vehicle as the vehicle is being driven, and provide information pertaining thereto to the computer system 154 for processing and for use in determining a second indication of the geographic location of the vehicle, as described further below. In certain embodiments, the location sensors 156 also provide information pertaining to the height and/or other identifying features of the objects overhead, and similarly provide this information to the computer system 154 for processing and for use in determining the second indication of the geographic location of the vehicle.

The location sensors 156 are preferably aimed in a generally upward direction from the vehicle. The location sensors 156 detect objects that are generally above the vehicle 100 as the vehicle 100 is in close proximity to the objects (for example, such that the object is preferably at an angle of at least forty-five degrees with respect to the direction of travel of the vehicle 100 at the time of detection). In a preferred embodiment, the location sensors 156 are aimed ninety degrees above a direction of travel of the vehicle, and have a relatively narrow field of view, so that an object is detected immediately above the vehicle. In certain other embodiments, the location sensors 156 may be aimed less than ninety degrees above the direction of travel. For example, in certain embodiments, the location sensors 156 may be aimed between forty-five degrees and ninety degrees above the direction of travel, with a relatively wider field of view (for example with a more complex sensor arrangement that can ascertain between multiple objects overhead by minimizing the distance to the objects).

The location sensors 156 preferably detect fixed objects, such as bridges, tunnels, overhead road signs, overhead street lights, buildings that may be overhead (such as in a downtown area of a large city), and the like, that are generally overhead of the vehicle. The location sensors 156 are preferably not configured to detect aircraft or other moving vehicles, and the range of the location sensors 156 is preferably limited so as not to detect, make contact with, or interfere with any aircraft or other vehicle. In one exemplary embodiment, the range of the location sensors is approximately fifty meters.

In one embodiment, the location sensors 156 comprise one or more lasers that are pointed in a generally upward direction from the vehicle, plus or minus forty-five degrees. In one embodiment, the one or more lasers are pointed upward, ninety degrees above the direction of travel of the vehicle. In certain embodiments, other location sensors 156 may also be used, such as one or more radar devices, cameras, ultrasonic sensors, light detection and ranging (LIDAR) sensors, and/or ambient light sensors, among other possible sensors. The sensors may be active (transmit and receive) or passive (receive only). The sensors may only detect the presence of an object, detect and provide a distance to an object, or detect and provide both a distance and direction of an object.

The other vehicle sensors 157 obtain data and information pertaining to the operation of the vehicle. This data and information is provided by the other vehicle sensors 157 to the computer system 154 for processing, for use in determining a measure of movement of the vehicle 100 after the overhead objects are detected, and for determining a third indication of the geographic location of the vehicle, as described further below. In one embodiment, one or more wheel speed sensors, compasses, steering wheel angle sensors, and/or yaw sensors are included in the other vehicle sensors 157.

The computer system 154 is coupled to the telecommunications system 150 and the sensor array 152. The computer system 154 utilizes the data and information from the telecommunications system 150 and the sensor array 152 for localizing the vehicle 100. Specifically, the computer system 154 determines or receives a first, initial indication of the vehicle 100's geographic location from the telecommunications system 150. In addition, the computer system 154 uses the first indication, along with the data and information from the location sensors 156, in determining a second, or more precise, indication of the vehicle's 100 geographic location when an object is detected overhead of the vehicle 100. The computer system 154 subsequently determines a third indication of the vehicle's 100 geographic location based on a measure of movement of the vehicle 100 away from the overhead object using additional information from the other vehicle sensors 157.

In the depicted embodiment, the computer system 154 includes a processor 160, a memory 162, an interface 164, a storage device 166, and a bus 168. In certain embodiments, the computer system 154 may also include one or more of the telecommunications system 150, the sensor array 152, and/or portions thereof, and/or one or more other devices. In addition, it will be appreciated that the computer system 154 may otherwise differ from the embodiment depicted in FIG. 1. For example, the computer system 154 may be coupled to or may otherwise utilize one or more remote computer systems and/or other control systems.

The processor 160 performs the computation and control functions of the computer system 154, and may comprise any type of processor or multiple processors, single integrated circuits such as a microprocessor, or any suitable number of integrated circuit devices and/or circuit boards working in cooperation to accomplish the functions of a processing unit. During operation, the processor 160 executes one or more programs 170 contained within the memory 162 and, as such, controls the general operation of the computer system 154 and the computer system of the computer system 154, preferably in executing the steps of the processes described herein, such as the steps of the process 200 described further below in connection with FIGS. 2 and 3.

The memory 162 can be any type of suitable memory. This would include the various types of dynamic random access memory (DRAM) such as SDRAM, the various types of static RAM (SRAM), and the various types of non-volatile memory (PROM, EPROM, and flash). The bus 168 serves to transmit programs, data, status and other information or signals between the various components of the computer system of the computer system 154. In a preferred embodiment, the memory 162 stores the above-referenced program 170 along with one or more stored values 172 for use in localization of the vehicle 100. In certain examples, the memory 162 is located on and/or co-located on the same computer chip as the processor 160.

The interface 164 allows communication to the computer system of the computer system 154, for example from a system driver and/or another computer system, and can be implemented using any suitable method and apparatus. It can include one or more network interfaces to communicate with other systems or components. The interface 164 may also include one or more network interfaces to communicate with technicians, and/or one or more storage interfaces to connect to storage apparatuses, such as the storage device 166.

The storage device 166 can be any suitable type of storage apparatus, including direct access storage devices such as hard disk drives, flash systems, floppy disk drives and optical disk drives. In one exemplary embodiment, the storage device 166 comprises a program product from which memory 162 can receive a program 170 that executes one or more embodiments of one or more processes of the present disclosure, such as the steps of the process 200 of FIG. 2 as illustrated in FIG. 3, described further below. In another exemplary embodiment, the program product may be directly stored in and/or otherwise accessed by the memory 162 and/or a disk (e.g., disk 174), such as that referenced below.

The bus 168 can be any suitable physical or logical means of connecting computer systems and components. This includes, but is not limited to, direct hard-wired connections, fiber optics, infrared and wireless bus technologies. During operation, the program 170 is stored in the memory 162 and executed by the processor 160.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 160) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the computer system 154 may also otherwise differ from the embodiment depicted in FIG. 1, for example in that the computer system of the computer system 154 may be coupled to or may otherwise utilize one or more remote computer systems and/or other control systems.

Figure 2:
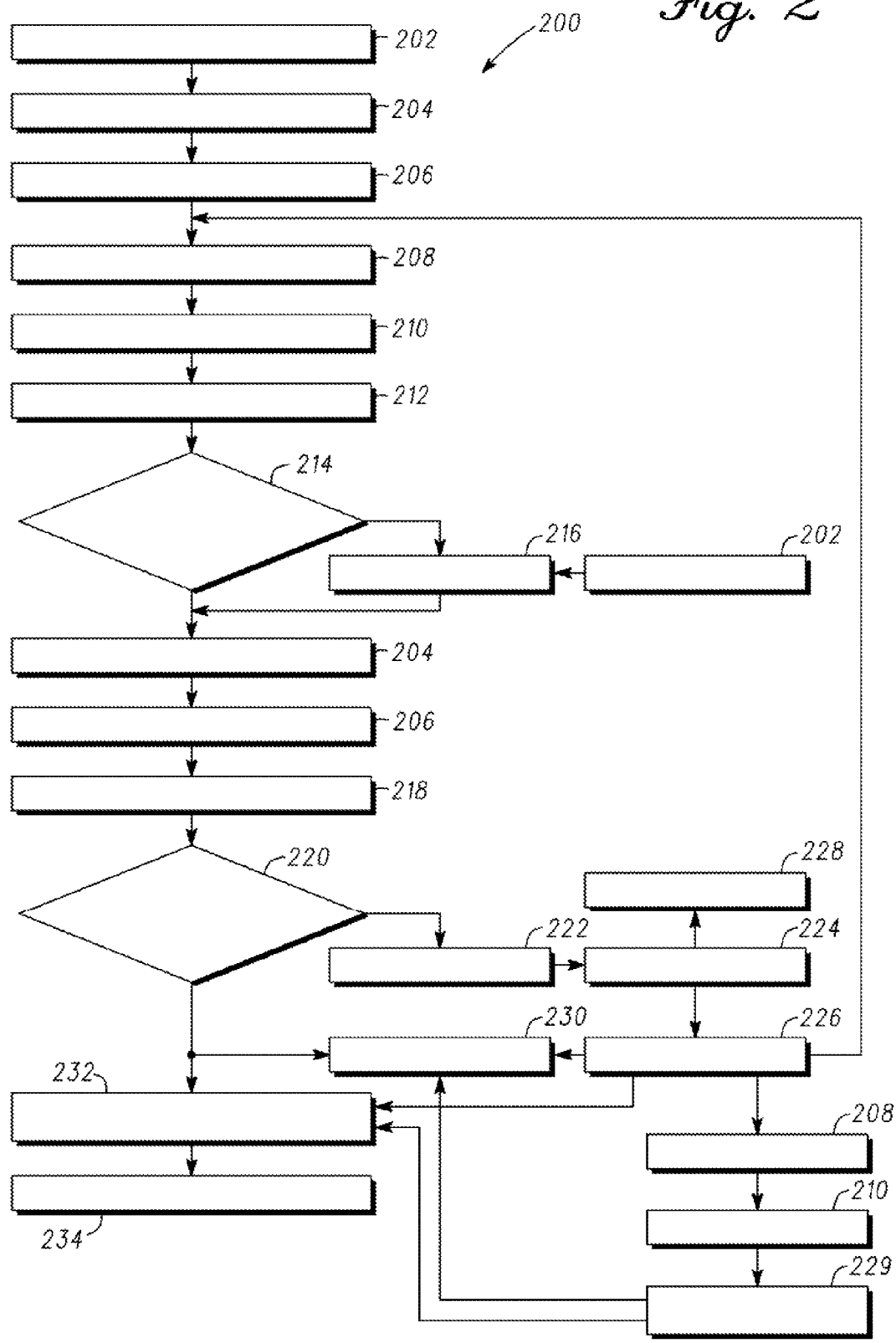
FIG. 2 is a flowchart of a process for localizing a vehicle, and that can be implementing in connection with the vehicle and the vehicle localization system of FIG. 1, in accordance with an exemplary embodiment.
Figure 3:
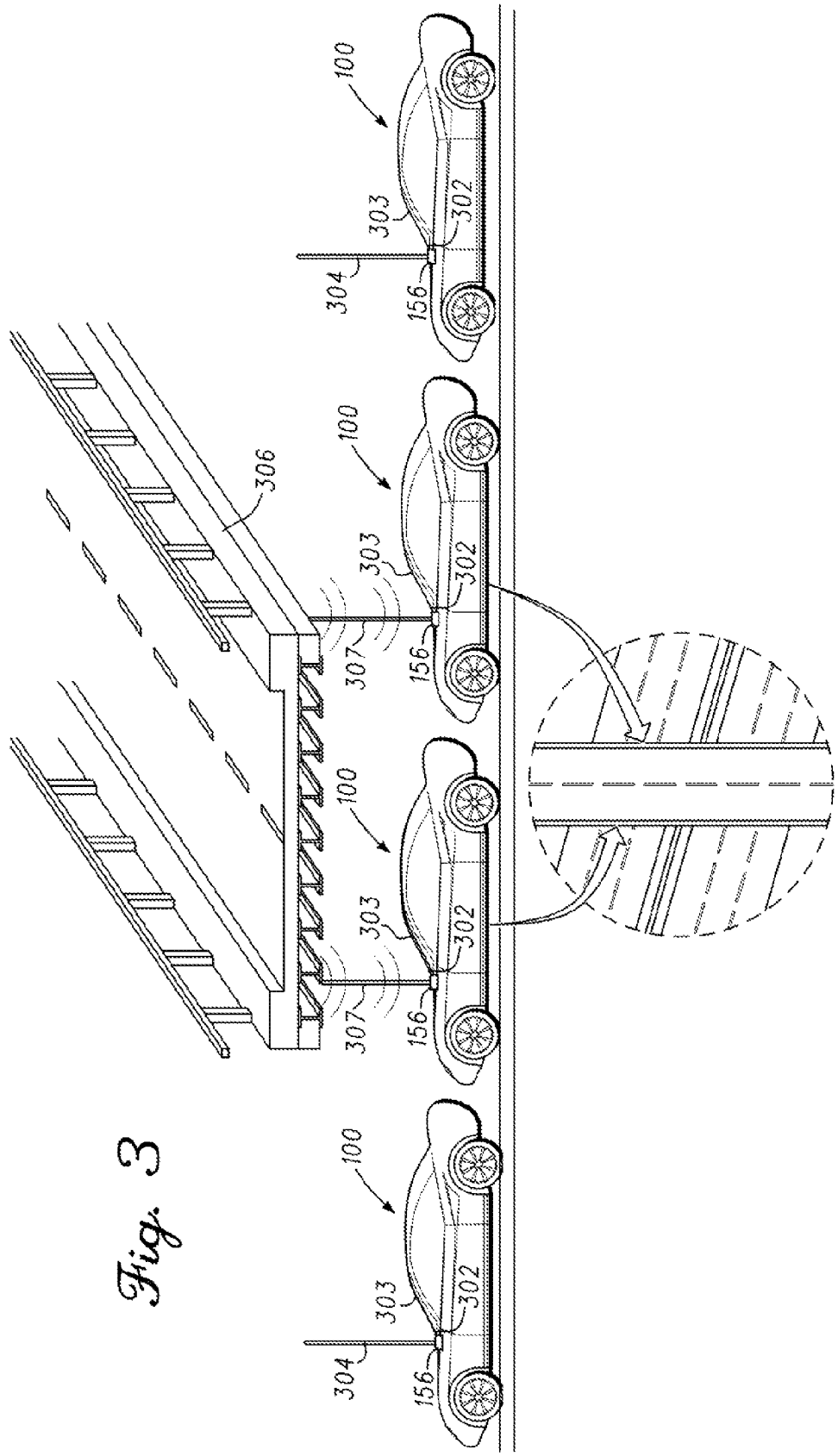
FIG. 3 is an illustration of the operating environment of a vehicle, such as the vehicle of FIG. 1, using a localization system to perform the process of FIG. 2, in accordance with an exemplary embodiment

FIG. 2 is a flowchart of a process 200 for localizing a vehicle, preferably an automobile, in accordance with an exemplary embodiment. The process 200 utilizes a detection of an object in a generally upward direction above the vehicle in determining an indication of the geographic location of the vehicle, among other features described below. The process 200 can be utilized in connection with the vehicle 100, including the localization system 120 thereof, in accordance with an exemplary embodiment.

As depicted in FIG. 2, the process 200 begins with the step of receiving information from a location network (step 202). During step 202, information is obtained pertaining to a first indication of the geographic location of the vehicle from the location network. This information is preferably obtained by the processor 160 of FIG. 1 from the telecommunications system 150 of FIG. 1, for example via a GPS network, a cellular network, or another type of radio frequency triangulation from a network. The first indication preferably comprises a relatively "coarse" indication of the geographic location (as compared with the subsequently-determined second and third indications, described further below). In certain embodiments, the last determined value from the location network is utilized, for example in situations in which communications with the location network may be blocked or the location network may not be functioning properly.

A map database is retrieved (step 204). The map database includes mapped information pertaining to the general geographic area represented by the first indication of step 202. In one embodiment, the map database is stored in the memory 162 as stored values 172 thereof and is retrieved by the processor 160 of FIG. 1. In another embodiment, the map database (or certain relevant portions thereof pertaining to the current location of the vehicle) is received by the telecommunications system 152 from the remote server 102 via the wireless network 104 and then provided to the processor 160. In one embodiment, a three dimensional map database is utilized.

The first indication of the geographic location of the vehicle is identified on the map database (step 206). This identification is preferably made by the processor 160 of FIG. 1. As part of steps 204 and/or 206, a particular geographic region is identified on the map database corresponding to the current location of the vehicle. In a preferred embodiment, the first identification also includes an identification of the road on which the vehicle is most likely traveling and a direction of travel of the vehicle.

In certain embodiments, other sensor data is also obtained pertaining to the operation of the vehicle (step 208). The data of step 208 preferably includes data indicative of movement of the vehicle, such as a speed and direction of travel of the vehicle. The data of step 208 is preferably obtained by the vehicle sensors 157 of FIG. 1 for processing by the processor 160 of FIG. 1. In one example, wheel speed values, compasses, steering wheel angle values, and yaw rate values are measured by one or more wheel speed sensors, steering wheel angle sensors, and yaw sensors of the other vehicle sensors 157 of FIG. 1 and are provided to the processor 160 of FIG. 1 for processing.

The data from step 208 is then utilized in certain embodiments in determining one or more measures of vehicle movement (step 210). In one preferred embodiment, the processor 160 of FIG. 1 calculates values of vehicle speed, direction, and distance travelled based on the data obtained in step 208.

An updated measure of the geographic location is then determined in certain embodiments (step 212). The updated measure preferably comprises an update or extension to the first indication of step 202. By way of example, as discussed above, the first indication of step 202 provides an initial, relatively course, indication of the vehicle's geographic location. The updated measure of step 212 is preferably determined by the processor 160 of FIG. 1.

A determination is then made as to whether updated information is available from the location network of step 202 (step 214). This determination is preferably made by the processor 160 of FIG. 1. If it is determined in step 214 that updated information is available, then updated information from the location network in a new iteration of step 202, and a location correction is determined using the updated information (step 216), after which the process proceeds to a new iteration of step 204 as depicted in FIG. 1. The updated correction of step 216 comprises an updated measure of the geographic location of the vehicle using the updated information from the location network, and is preferably determined by the processor 10 of FIG. 1. Conversely, if it is determined in step 214 that updated information is not available, then the process proceeds directly to the new iteration of step 204, described directly below.

The map database is retrieved again in a new iteration of step 204. The updated measure of the geographic location of the vehicle of step 212 is identified on the map in a new iteration of step 206. database (step 206). This identification is preferably made by the processor 160 of FIG. 1. As part of steps 204 and/or 206, a particular geographic region is identified on the map database corresponding to the current location of the vehicle. In a preferred embodiment, the first identification also includes an identification of the road on which the vehicle is most likely traveling and a direction of travel of the vehicle.

Data and information are obtained from location sensors (step 218). Preferably, one or more location sensors 156 of FIG. 1 are aimed generally upward (most preferably ninety degrees above the direction of travel of the vehicle, as described above in connection with FIG. 1), and obtain data and information pertaining to any fixed objects that are generally overhead of the vehicle as it is travelling. In certain embodiments, multiple fixed objects may be detected, so as to help identify the particular object(s).

The data and information pertain to fixed objects such as bridges, tunnels, overhead road signs, overhead street lights, and buildings that are generally overhead of the vehicle and in close proximity to the objects (for example, such that the object is preferably at an angle of at least forty-five degrees with respect to the direction of travel of the vehicle at the time of detection).

In certain embodiments, the data and information of step 218 include one or more features of the overhead object(s), in addition to the position of the overhead object. For example, in one such embodiment, a height above the vehicle is measured for the overhead object(s) by the location sensors 156. In other embodiments, other features may also be measured or obtained, such as, by way of example, a width, length, and/or density of the overhead object.

A determination is made as to whether an overhead object is detected (step 220). The determination of step 220 is preferably made by the processor 160 of FIG. 1 using the data and information obtained by the location sensor(s) 156 of FIG. 1 during step 218. If it is determined than an overhead object is detected, then the process proceeds to step 222, described directly below. Conversely, if it is determined that an overhead object is not detected, then the process instead skips to steps 230-234, described further below.

During step 222, an initial assessment of the overhead object is made. Specifically, the initial assessment preferably comprises an assessment as to the type of overhead object, such as a bridge, tunnel, road sign, street light, building, or the like. The initial assessment is preferably made by the processor 160 of FIG. 1 based on the data and information provided by the location sensors 156 of FIG. 1 from step 218.

Information pertaining to the overhead object(s) is correlated with information from the map database (step 224). Specifically, the data, information, and/or indications of steps 204 and 206 are correlated with the data, information, and assessments of steps 218 and 222. The correlation and accompanying inquiry of step 224 is preferably performed by the processor 160 of FIG. 1. In a preferred embodiment, the data and information of step 218 and the initial assessment of step 222 are utilized to find a match on the database. Specifically, a position is identified on the map database of step 204 proximate a region associated with the first indication of step 206 in which the overhead object of steps 218 and 222 can be found on the map database of step 204.

For example, if the initial indication of step 206 is that the vehicle is on a particular block in a downtown region, and the data, information, and/or initial assessment provide that the vehicle is proximate a street light of a certain height, then, during step 224, an inquiry may be provided as to where on the map there is a street light of the particular height along the particular block in which the vehicle is travelling. By way of another example, if the initial indication of step 206 is that the vehicle is on a particular road and the data, information, and/or initial assessment provide that the vehicle is proximate a bridge of a certain size, then, during step 224, an inquiry may be provided as to where on the map there is a bridge of that size along the particular road in which the vehicle is travelling. By way of an additional example, if the initial indication of step 206 is that the vehicle is on a particular highway near an interchange in which the vehicle could turn in one of multiple directions, and the data, information, and/or initial assessment provide that the vehicle has encountered a particular highway overpass above the vehicle (or, if, the vehicle has travelled underneath a specific number of overpasses above it), then an inquiry can be made during step 224 as to which lane or turn-off the vehicle has taken for the interchange based on information as to the specific overpasses on the map.

The results from the correlation of step 224 are utilized in generating a second indication of the geographic location of the vehicle (step 226). Specifically, the second indication preferably represents a refinement of the first indication of step 202 (and/or a refinement of the updated measure of step 212), after taking into account the processing of the data and information pertaining to the overhead object(s) during steps 218-224. The second indication is preferably determined by the processor 160 of FIG. 1 during step 226 using the first indication of step 202 (and/or the updated measure of step 212) and the correlation between the overhead object information and the map database.

Preferably, the first indication of step 202 (and/or the updated measure of step 212) comprises a broader measure of the vehicle's geographic location (within a relatively larger margin of error), and the second indication comprises a more refined estimate of the vehicle's location within a relatively smaller margin of error. With respect to the first example described above, the first indication of step 202 (and/or the updated measure of step 212) may provide a particular block in a downtown area in which the vehicle is travelling, whereas the second indication may provide a specific segment or location along that block (for example, near a traffic light or other object detected above the vehicle). With respect to the second example discussed above, the first indication of step 202 (and/or the updated measure of step 212) may provide a highway segment on which the vehicle is travelling, and the second indication may provide a particular location along that highway underneath a specific bridge. With respect to the third example described above, the first indication of step 202 (and/or the updated measure of step 212) may comprise a measure of a particular highway segment on which the vehicle is travelling near an interchange in which the vehicle could turn in one of multiple directions, and the second indication may provide a specific location along the interchange at which the vehicle is located, including a specific lane of travel or turn-off initiated, based on identifying objects above the vehicle.

In certain embodiments, information regarding the overhead object may also be stored in memory (step 228). In one such example, the location of a street light or other object is stored in memory so that the overhead object is more easily recognized in a future drive cycle in which the vehicle may be travelling in same general geographic area. The stored information may also include other information regarding a history of travel of the vehicle, such as a particular route taken often by the vehicle, and the like. The information of step 228 is preferably stored in the memory 162 of FIG. 1 by the processor 160 of FIG. 1.

In certain embodiments, other sensor data is also obtained pertaining to the operation of the vehicle, in a new iteration of step 208. The data of this iteration of step 208 preferably includes data indicative of movement of the vehicle, such as a speed and direction of travel of the vehicle. The data of this iteration of step 208 is preferably obtained by the vehicle sensors 157 of FIG. 1 for processing by the processor 160 of FIG. 1 after the data pertaining to the overhead object is obtained. In one example, wheel speed values, compasses, steering wheel angle values, and yaw rate values are measured by one or more wheel speed sensors, steering wheel angle sensors, and yaw sensors of the other vehicle sensors 157 of FIG. 1 and are provided to the processor 160 of FIG. 1 for processing.

The data from the most recent iteration of step 208 is then utilized in determining one or more measures of vehicle movement, in a new iteration of step 210). In one preferred embodiment, the processor 160 of FIG. 1 calculates values of vehicle speed, direction, and distance travelled based on the data obtained in the most recent iteration of step 208 after the overhead object is detected, so as to indicate a magnitude and direction that the vehicle has travelled after the vehicle has passed the overhead object.

A third indication of the geographic location is then determined (step 229). The third indication preferably comprises an update or extension to the second indication of step of step 226. By way of example, as discussed above, the first indication of step 202 (and/or the updated measure of step 212) provides an initial, relatively course, indication of the vehicle's geographic location. Also as discussed above, the second indication of step 226 provides a refined indication of the vehicle's geographic location when an identifiable overhead object is above the vehicle. The third indication of step 229 allows for the refinement (and the accompanying reduced margin of error) of the second indication of step 226 to be maintained, at least to a degree, for a limited amount of time until the next overhead object is detected. For example, if an overhead traffic light was used in step 226 to provide a refined indication of the vehicle's geographic location, then the third indication can be used to approximate an updated geographic location using a velocity and direction of travel of the vehicle from the point underneath the traffic light until another overhead object is detected. The third indication of step 229 is preferably determined by the processor 160 of FIG. 1.

The most recent indications of travel are provided to a navigation system (step 230). Preferably, the first indication of step 202, the updated measure of step 212, the second indication of step 226, and/or the third indication of step 229 (whichever is most recent) is provided by the processor 160 of FIG. 1 to the navigation system 119 of FIG. 1 in order to convey audio and/or visual information to the driver and/or other occupants of the vehicle as to the current geographic location of the vehicle. Preferably, the current, or most recent, location is provided for the driver in the cockpit of the vehicle.

In addition, in certain embodiments, the most recent indications of the vehicle's geographic location are also fused with data from various other vehicle sensors, systems, and/or devices (step 232). During step 232, the now localized map information (including the ability to tell the position of various road features relative to the host vehicle given the position of the host vehicle on the map with a high degree of accuracy) is fused with information from other object detection sensors (for example, radar, lidar, camera, ultrasonic, and the like) in order to produce a comprehensive image of the surroundings of the host vehicle.

In one embodiment, during step 232, the first indication of step 202, the updated measure of step 212, the second indication of step 226, and/or the third indication of step 229 (whichever is most recent) is fused with data provided by the other vehicle sensors 157 of FIG. 1 (such as wheel and/or vehicle speed data, vehicle steering data, vehicle direction data, vehicle braking data, environmental condition data, road condition data, and/or various other types of vehicle-related data) in order to provide a comprehensive, updated set of parameter values pertaining to position and operation of the vehicle.

In certain embodiments, the fused data (and/or separate values of the most recent indications of the geographic location of the vehicle) are provided (step 234) to one or more active safety systems of the vehicle for selectively implementing an active safety feature (such as automatic steering, automatic braking, and/or autonomous driving, by way of example), and/or to one or more other vehicle systems, such as those described above in connection with the control system 118 of FIG. 1. Preferably, the comprehensive image from step 232 is used to feed active safety and autonomous driving features as part of step 234.

Thus, the process 200 provides localization for the vehicle 100 using objects that are detected above the vehicle. The process 200 of FIG. 2 (and the localization system 120 of FIG. 1) can help to improve precision of existing location systems (such as GPS systems and radio frequency triangulation systems), for example, by improving the margin of error in operation of such systems. In addition, when the vehicle is travelling with large objects (such as tunnels, bridges, and the like) overhead, and communications with existing location systems (such as GPS and radio frequency triangulation systems) may be blocked or impaired by the overhead objects, the process 200 of FIG. 2 (and the localization system 120 of FIG. 1) can still provide the location information with enhanced precision.

The steps of the process 200 are preferably conducted, most preferably continuously, throughout a current ignition cycle of the vehicle. Accordingly, updated values for the first, second, and third indications are preferably continuously determined, and the most recent values are provided for the vehicle navigation system, active safety systems, and/or other vehicle systems for implementation within the vehicle Turning now to FIG. 3, an illustration is provided of the operating environment of a vehicle (such as the vehicle 100 of FIG. 1) using a localization system (such as the localization system 120 of FIG. 1) to perform the process 200 of FIG. 2, in accordance with an exemplary embodiment. As depicted in FIG. 3, in one embodiment, a location sensor 156 is disposed at a base 302 of a front windshield 303 of the vehicle 100 of FIG. 1, and is aimed in an upward direction that is perpendicular to a direction of travel of the vehicle 100. The location sensor 156 (for example, a laser, in one preferred embodiment), emits a signal or beam 304 in this upward direction. Also as depicted in FIG. 3, the location sensor 156 receives a return signal or beam 307 that is reflected from an object 306 above the vehicle 100 for detection and identification of the object 306, and for use in providing the localization in conjunction with the above-described steps of the process 200 of FIG. 2.

Accordingly, methods, systems, and vehicles are provided for localization of a vehicle. The disclosed methods, systems, and vehicles provide for potentially improved localization of the vehicle using detection of objects in a generally upward direction above the vehicle, and correlating information pertaining to the detected objects with a map database. As a result, a determination can be made regarding the location of the vehicle with potentially improved precision as compared with traditional techniques. The information can be used to supplement data from another location system (such as a GPS system or a cellular triangulation system) or, in conjunction with other types of vehicle systems, to fuse data from various systems and/or for use in active safety functionality of the vehicle.

It will be appreciated that the disclosed methods, systems, and vehicles may vary from those depicted in the Figures and described herein. For example, the vehicle 100, the localization system 120, and/or various components thereof may vary from that depicted in FIG. 1 and described in connection therewith. In addition, it will be appreciated that certain steps of the process 200 may vary from those depicted in FIGS. 2 and 3 and/or described above in connection therewith. It will similarly be appreciated that certain steps of the process described above may occur simultaneously or in a different order than that depicted in FIGS. 2 and 3 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for localizing a vehicle, the method comprising the steps of:
   detecting an object with a location sensor, the object disposed in a generally upward direction from the vehicle, approximately overhead of the vehicle, the object disposed in proximity to the vehicle, wherein the object is detected by emitting a signal via a beam with a defined edge via the location sensor in the generally upward direction approximately overhead of the vehicle, and receiving, via the location sensor, a return signal that is reflected from the object while the vehicle is travelling;
   correlating the object via a processor with information from a map database, thereby generating a correlation; and
   determining via the processor a geographic location of the vehicle based on the correlation, for augmenting data provided by a global positioning system (GPS);
   wherein the step of determining the geographic location of the vehicle comprises:
      determining a first indication of the geographic location of the vehicle based on data provided by the GPS, the first indication comprising a geographic region for the vehicle;
      determining a second indication of the geographic location of the vehicle based on a refinement of the first indication based on the correlation between the detected overhead object and the map database, and based on a position of the detected overhead object within the geographic region; and
      determining a third indication of the geographic location of the vehicle, the third indication comprising a further refinement of the second indication of the geographic location based on a measured velocity and direction of travel of the vehicle, as determined via measurements from one or more vehicle position or movement sensors, from a first point in which the object is detected overhead the vehicle and the vehicle is approximately directly underneath the object, to thereby provide the refined third indication while the vehicle is travelling from the first point that is approximately directly underneath the object to a second point that is approximately directly underneath a second object that is detected overhead the vehicle subsequent to the detection of the first object, wherein the one or more vehicle position or movement sensors are disposed onboard the vehicle and are configured to measure a position or movement of the vehicle.

2. The method of claim 1, further comprising the steps of:
   aiming the location sensor in a direction that is generally upward from the vehicle and approximately overhead of the vehicle, approximately ninety degrees from a direction of travel of the vehicle;
   wherein the step of detecting the object comprises the step of detecting the object via the location sensor by emitting the signal via the location sensor toward the object in the direction that is generally upward from the vehicle and approximately overhead of the vehicle, approximately ninety degrees from the direction of travel of the vehicle and receiving the return signal from the object from the direction that is generally upward from the vehicle and approximately overhead of the vehicle approximately ninety degrees from the direction of travel of the vehicle while the vehicle is travelling.

3. The method of claim 1, wherein the one or more vehicle position or movement sensors are selected from the group consisting of: speed sensors, compasses, steering wheel angle sensors, and yaw sensors.

4. The method of claim 1, wherein the step of correlating the object with the information from the map database comprises the steps of:
   identifying a geographic region in which the vehicle is travelling on the map database; and
   identifying the object within the geographic region on the map database.

5. The method of claim 1, wherein:
   the step of detecting the object comprises detecting an object that is obstructing use of the GPS for the vehicle by emitting a signal via the location sensor in the generally upward direction approximately overhead of the vehicle and receiving, via the location sensor, a return signal that is reflected from the object while the objected is obstructed use of the GPS for the vehicle while the vehicle is travelling; and
   the method further comprises using the geographic location as determined using the detected object to augment the GPS when the GPS is obstructed by the object while the vehicle is traveling.

6. The method of claim 1, further comprising the step of:
   obtaining a first indication of a location of the vehicle via the GPS, wherein:
   the step of correlating the object comprises the step of identifying the object proximate the first indication on the map database, thereby generating an identification of the object; and
   the step of determining the geographic location comprises the step of determining a second indication of the location of the vehicle based on the identification of the object.

7. The method of claim 6, further comprising the steps of:
   obtaining data pertaining to operation of the vehicle from one or more vehicle sensors;
   determining a measure of movement of the vehicle after the detecting of the object, using the data; and
   determining a third indication of the geographic location of the vehicle based on the second indication and the measure of movement.

8. The method of claim 1, wherein:
   the step of detecting the object comprises detection an object that is obstructing use of the GPS for the vehicle by emitting a signal via the location sensor in the generally upward direction approximately overhead of the vehicle and receiving, via the location sensor, a return signal that is reflected from the object while the objected is obstructed use of the GPS for the vehicle while the vehicle is travelling; and
   the method further comprises using the detected object in place of the GPS when the GPS is obstructed by the object while the vehicle is travelling.

9. The method of claim 1, wherein the location sensor provides a beam with an approximately vertical edge for detecting the object.

10. The method of claim 1, wherein the location sensor is selected from the group consisting of a laser, an ultrasonic sensor, and a camera.

11. The method of claim 1, wherein the location sensor comprises a laser.

12. A system for localizing a vehicle, the method comprising the steps of:
- a location sensor configured to detect an object disposed proximate the vehicle in a generally upward direction from the vehicle, approximately overhead of the vehicle, by emitting a signal via a beam with a defined edge in the generally upward direction approximately overhead of the vehicle and receiving a return signal that is reflected from the object while the vehicle is travelling;
- a processor coupled to the location sensor and configured to:
  - correlate the object with information from a map database, thereby generating a correlation; and
  - determine a geographic location of the vehicle based on the correlation, for augmenting data provided by a global positioning system (GPS); and
- one or more vehicle position or movement sensors disposed onboard the vehicle and configured to measure a position or movement of the vehicle;
- wherein the processor is coupled to the one of more vehicle position or movement sensors and is configured to at least facilitate;
  - determining a first indication of the geographic location of the vehicle based on data provided by the GPS, the first indication comprising a geographic region for the vehicle;
  - determining a second indication of the geographic location of the vehicle based on a refinement of the first indication based on the correlation between the detected overhead object and the map database, and based on a position of the detected overhead object within the geographic region; and
  - determining a third indication of the geographic location of the vehicle, the third indication comprising a further refinement of the second indication of the geographic location based on a measured velocity and direction of travel of the vehicle, as determined via measurements obtained from the one or more vehicle position or movement sensors, from a first point in which the object is detected overhead the vehicle and the vehicle is approximately directly underneath the object, to thereby provide the refined third indication while the vehicle is travelling from the first point that is approximately directly underneath the object to a second point that is approximately directly underneath a second object that is detected overhead the vehicle subsequent to the detection of the first object.

13. The system of claim 12, wherein the location sensor provides a beam with an approximately vertical edge for detecting the object.

14. A vehicle comprising:
- a body;
- a global positioning system (GPS);
- a drive system disposed within the body; and
- a localization system disposed within the body, the localization system comprising:
  - a location sensor configured to detect an object disposed proximate the vehicle in a generally upward direction, approximately overhead of the vehicle, from the vehicle by emitting a signal via a beam with a defined edge in the generally upward direction approximately overhead of the vehicle and receiving a return signal that is reflected from the object while the vehicle is travelling; and
  - a processor coupled to the sensor and configured to:
    - correlate the object with information from a map database, thereby generating a correlation; and
    - determine a geographic location of the vehicle based on the correlation, for augmenting data provided by a global positioning system (GPS);
  - wherein:
    - the localization system further comprises one or more vehicle position or movement sensors disposed onboard the vehicle and configured to measure a position or movement of the vehicle; and
    - the processor is coupled to the one of more vehicle position or movement sensors and is configured to at least facilitate:
      - determining a first indication of the geographic location of the vehicle based on data provided by the GPS, the first indication comprising a geographic region for the vehicle;
      - determining a second indication of the geographic location of the vehicle based on a refinement of the first indication based on the correlation between the detected overhead object and the map database, and based on a position of the detected overhead object within the geographic region; and
      - determining a third indication of the geographic location of the vehicle, the third indication comprising a further refinement of the second indication of the geographic location based on a measured velocity and direction of travel of the vehicle, as determined via measurements obtained from the one or more vehicle position or movement sensors, from a first point in which the object is detected overhead the vehicle and the vehicle is approximately directly underneath the object, to thereby provide the refined third indication while the vehicle is travelling from the first point that is approximately directly underneath the object to a second point that is approximately directly underneath a second object that is detected overhead the vehicle subsequent to the detection of the first object.

15. The vehicle of claim 14, wherein the location sensor provides a beam with an approximately vertical edge for detecting the object.

16. The vehicle of claim 14, wherein the location sensor is selected from the group consisting of a laser, an ultrasonic sensor, and a camera.

17. The vehicle of claim 14, wherein the location sensor comprises a laser.

* * * * *